United States Patent
Oh et al.

(10) Patent No.: US 9,448,429 B2
(45) Date of Patent: Sep. 20, 2016

(54) METHOD OF FABRICATING LIGHTWEIGHT AND THIN LIQUID CRYSTAL DISPLAY DEVICE

(71) Applicants: LG DISPLAY CO., LTD., Seoul (KR); NIPPON ELECTRIC GLASS CO., LTD., Shiga (JP)

(72) Inventors: JaeYoung Oh, Goyang-si (KR); JaeDuk Jo, Chilgok-gun (KR); ByeongKeun Kim, Gumi-si (KR); GiSang Hong, Paju-si (KR); YoungKwang Park, Chilgok-gun (KR); EunJin Bae, Daegu (KR); KangHoon Lee, Paju-si (KR); HyooKyung Choi, Gumi-si (KR); Yasuhiro Matsumoto, Shiga (JP)

(73) Assignees: LG Display Co., Ltd., Seoul (KR); Nippon Electric Glass Co., Ltd., Shiga (JP)

(*) Notice: Subject to any disclaimer, the term of this patent is extended or adjusted under 35 U.S.C. 154(b) by 24 days.

(21) Appl. No.: 14/143,464

(22) Filed: Dec. 30, 2013

(65) Prior Publication Data
US 2014/0295590 A1 Oct. 2, 2014

(30) Foreign Application Priority Data
Mar. 29, 2013 (KR) .................. 10-2013-0034760

(51) Int. Cl.
*G02F 1/1335* (2006.01)
*G02F 1/1333* (2006.01)

(52) U.S. Cl.
CPC . *G02F 1/1333* (2013.01); *G02F 2001/133302* (2013.01)

(58) Field of Classification Search
CPC .. G02F 1/1333; G02F 1/3306; G02F 1/1326; G02F 1/36; G02F 2001/136218; G02F 1/1533
See application file for complete search history.

(56) References Cited

U.S. PATENT DOCUMENTS 8,951,084 B2 * 2/2015 Kwon .................. G02F 1/1333 349/153
2014/0179190 A1 * 6/2014 Lee ....................... G02F 1/1333 445/24

FOREIGN PATENT DOCUMENTS

CN 101242951 A 8/2008
(Continued)

OTHER PUBLICATIONS

Fukda, Japenese Patent Application 2010-024484, Feb. 2010, machine translation.*
(Continued)

*Primary Examiner* — Tracie Y Green
(74) *Attorney, Agent, or Firm* — Brinks Gilson & Lione

(57) ABSTRACT

Disclosed is a method for fabricating a lightweight and thin liquid crystal display (LCD) device, using a supplementary substrate for processing of a thin glass substrate. Inactive gas is sprayed onto the surface of the substrate to thus remove OH groups from the surface, before the thin glass substrate and the supplementary substrate are attached to each other. Under such configuration, the supplementary substrate can be easily separated from a completed liquid crystal panel which is in an attached cell state, without any damages.

7 Claims, 10 Drawing Sheets

(56) References Cited

FOREIGN PATENT DOCUMENTS

| | | | |
|---|---|---|---|
| CN | 102778771 | A | 11/2012 |
| CN | 102890353 | A | 1/2013 |
| JP | 2007141892 | A | 6/2007 |
| JP | 2008203712 | A | 9/2008 |
| JP | 2008216650 | A | 9/2008 |
| JP | 2010024484 | A | 2/2010 |
| JP | 2013025317 | A | 2/2013 |
| KR | 1020080054574 | | 6/2008 |
| KR | 1020120136877 | | 12/2012 |
| TW | 201245809 | A | 11/2012 |
| TW | 201307952 | A | 2/2013 |

OTHER PUBLICATIONS

Lee et al., Taiwan Patent Application 201307952, Jul. 2012, machine translation.*

Notice of Allowance issued in Korean Application No. 10-2013-0034760, mailed Jul. 31, 2014, 2 pages.

Office Action issued in Japanese Application No. 2013-273068, mailed Aug. 28, 2014, 6 pages.

Office Action dated Jun. 10, 2015 for corresponding Taiwanese Patent Application No. 102149098, 12 pages.

Office Action dated May 26, 2016 for Chinese Application No. 201310751635.0, 13 pages.

\* cited by examiner

METHOD OF FABRICATING LIGHTWEIGHT AND THIN LIQUID CRYSTAL DISPLAY DEVICE

CROSS-REFERENCE TO RELATED APPLICATION

Pursuant to 35 U.S.C. §119(a), this application claims the benefit of earlier filing date and right of priority to Korean Application No. 10-2013-0034760, filed on Mar. 29, 2013, the contents of which is incorporated by reference herein in its entirety.

BACKGROUND OF THE DISCLOSURE

1. Field of the Disclosure

The present disclosure relates to a method for fabricating a liquid crystal display (LCD) device, and particularly, to a method for fabricating a lightweight and thin LCD device.

2. Background of the Disclosure

Recently, in the recent information-oriented society, the field of displays for processing and displaying a large amount of information has been remarkably developed. Nowadays, thin film transistor (TFT)-liquid crystal display (LCD) devices having a light weight, a small thickness and lower power consumption are being developed to replace the conventional cathode ray tube (CRT).

The LCD device largely includes a color filter substrate, an array substrate, and a liquid crystal layer formed between the color filter substrate and the array substrate.

The color filter substrate is composed of a color filter including red, green and blue (RGB) sub color filters; a black matrix configured to partition the sub color filters from each other, and configured to block light which transmits the LC layer; and a transparent common electrode configured to apply a voltage to the LC layer.

Gate lines and data lines, which define pixel regions by being arranged in horizontal and vertical directions, are formed on the array substrate. A thin film transistor (TFT), a switching device is formed at each intersection of the gate lines and the data lines. A pixel electrode is formed at each pixel region.

The color filter substrate and the array substrate are attached to each other so as to face each other by a sealant formed at an outer periphery of an image display region, thereby implementing an LC panel. The color filter substrate and the array substrate are attached to each other by an attaching key formed at the color filter substrate or the array substrate.

Such LCD device mainly used for a portable electronic device should have a reduced size and weight, for enhanced portability of the electronic device. Moreover, as large LCD devices are being fabricated nowadays, such demand for lightweight and thin LCD devices increases.

There are various methods to reduce the thickness or the weight of an LCD device. However, there is a limitation in reducing the weight of core components of the LCD device. Moreover, it is very hard to reduce the thickness or the weight of an LCD device by reducing the weight of the core components, because the weight of the core components is very small.

Accordingly, a method for reducing a thickness and a weight of an LCD device by reducing a color filter substrate and an array substrate of an LC panel is being actively researched. However, in this case, the substrates may be bent or broken while undergoing a plurality of unit processes, due to small thicknesses thereof.

SUMMARY OF THE DISCLOSURE

A method for fabricating a lightweight and thin liquid crystal display device, the method comprises: providing a first supplementary substrate, a second supplementary substrate, a thin first mother substrates, and a thin second mother substrate; spraying gas onto at least one surface of the first supplementary substrate and the thin first mother substrate, and thereby removing OH groups from the surface; spraying gas onto at least one surface of the second supplementary substrate and the thin second mother substrate, and thereby removing OH groups from the surface; attaching the first supplementary substrate and the second supplementary substrate onto the thin first mother substrate and the thin second mother substrate, respectively; performing an array process on the first mother substrate onto which the first supplementary substrate has been attached; performing a color filter process on the second mother substrate onto which the second supplementary substrate has been attached; attaching the first mother substrate having undergone the array process, to the second mother substrate having undergone the color filter process; and separating the first and second supplementary substrates from the first and second mother substrates, respectively.

According to another aspect, a method for fabricating a lightweight and thin liquid crystal display device, uses a supplementary substrate for processing of a thin glass substrate, wherein the step of attaching the thin glass substrate to the supplementary substrate comprises: introducing the thin glass substrate and the supplementary substrate onto a substrate introducing line; transferring the thin glass substrate and the supplementary substrate introduced into the substrate introduction line, to a substrate washing line, thereby performing a prescribed washing process; transferring the washed thin glass substrate and supplementary substrate to a substrate surface processing line, and spraying gas onto at least one surface of the thin glass substrate and the supplementary substrate, thereby removing OH groups from the surface; transferring the thin glass substrate and the supplementary substrate to a substrate attaching line, thereby attaching the thin glass substrate and the supplementary substrate to each other; and transferring the thin glass substrate and the supplementary substrate attached to each other, to an inspecting line, thereby performing an inspection process.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE EXEMPLARY EMBODIMENTS

A description will now be given in detail of the exemplary embodiments, with reference to the accompanying drawings. For the sake of brief description with reference to the drawings, the same or equivalent components will be provided with the same reference numbers, and description thereof will not be repeated.

As liquid crystal display (LCD) devices are being actively used for many purposes in recent years, a lightweight and thin LCD device is spotlighted. Further, research is ongoing in order to reduce the thickness of a substrate, the most influential factor on the thickness of an LC panel. As a retarder or a protection substrate having a touch function is added to a 3D panel or a touch panel, a small thickness of a substrate is much required. However, processing a thin substrate may have restrictions, because physical properties of the thin substrate such as a bending characteristic and the strength are weakened.

In order to solve such problems, in the present invention, a supplementary substrate is attached onto a thin glass substrate, and then the supplementary substrate is detached from the thin glass substrate after processes for fabricating a lightweight and thin LCD device are completed.

Hereinafter, a method for fabricating a lightweight and thin liquid crystal display (LCD) device according to a preferred embodiment of the present invention will be explained in more detail with reference to the attached drawings.

Figure 1:
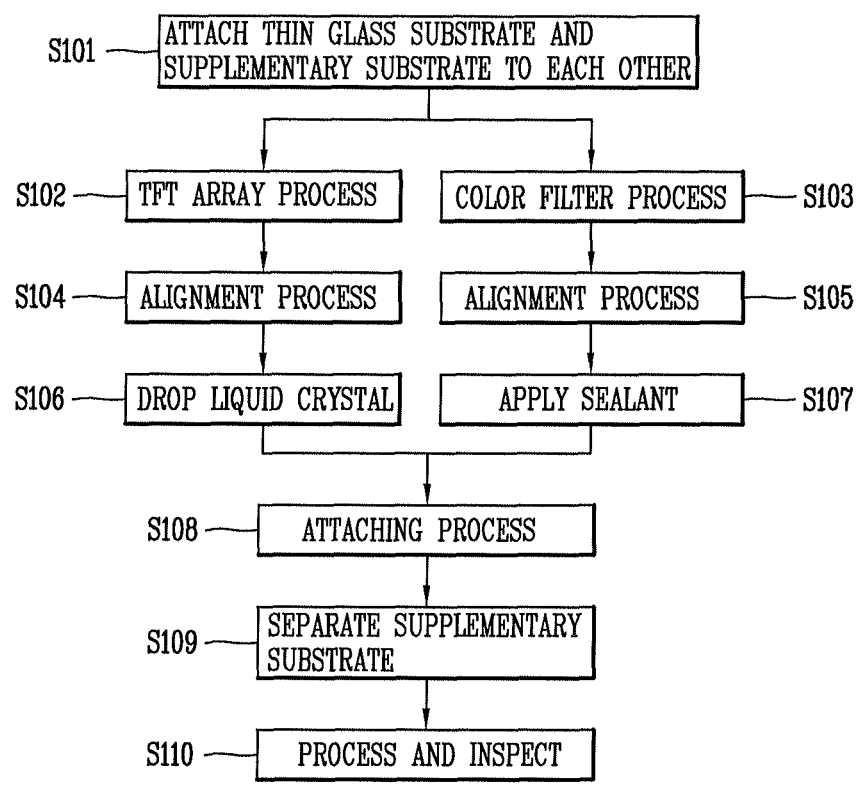
FIG. 1 is a flowchart schematically illustrating a method for fabricating a lightweight and thin liquid crystal display (LCD) device according to the present invention.

FIG. 1 is a flowchart schematically illustrating a method for fabricating a lightweight and thin liquid crystal display (LCD) device according to the present invention.

FIG. 1 illustrates a method for fabricating an LCD device in a case where a liquid crystal (LC) layer is formed by an LC dropping method. However, the present invention is not limited to this. That is, the present invention is also applicable to a method for fabricating an LCD device in a case where an LC layer is formed by an LC injecting method.

Processes for fabricating an LCD device may be largely categorized into a driving device array process for forming a driving device on a lower array substrate, a color filter process for forming a color filter on an upper color filter substrate, and a cell process.

As aforementioned, there are many factors to influence on the weight or the thickness of an LCD device. Among such various factors, the thickness or the weight of a glass color filter substrate or a glass array substrate is the most influential. Therefore, the thickness or the weight of such glass substrate should be reduced in order to reduce the thickness or the weight of the LCD device.

Methods for reducing the thickness or the weight of such glass substrate include a method for reducing the thickness of a glass substrate in an etching manner, and a method using a thin glass substrate. According to the first method, a glass etching process is further performed after a cell is completed. However, the first method is disadvantageous in that inferiority of a glass substrate may occur during the glass etching process, and the fabrication cost is increased.

In order to solve such problems, in the present invention, an array process, a color filter process and a cell process are performed using a thin glass substrate having a thickness of about 0.1 t~0.4 t. As the thin glass substrate is attached onto a supplementary substrate, a bent degree of the thin glass substrate is minimized, and the thin glass substrate is not damaged while moving. Here, 't' indicates a millimeter. Therefore, 0.1 t means the thickness of 0.1 mm, and 0.4 t means the thickness of 0.4 mm. Hereinafter, 'mm' will be referred to as 't' for convenience.

That is, the thin glass substrate having a thickness of about 0.1 t~0.4 t is greatly bent when introduced into a general LCD manufacturing line. This may cause the thin glass substrate to be severely downward-deformed, and thus may cause a problem in transferring the thin glass substrate using a transfer means such as a cassette. Further, the thin glass substrate is drastically bent even by a small impact when loaded and unloaded to/from unit processing equipment. This may cause positional errors to occur frequently, resulting in increasing damages due to collision, etc. Therefore, it was substantially impossible to perform such processes In order to solve such problems, in the present invention, a supplementary substrate is attached to a thin glass substrate having a thickness of 0.1 t~0.4 t, before the thin glass substrate is introduced into a manufacturing line. Accordingly, the thin glass substrate is made to have the same thickness (about 0.7 t) as a general glass substrate for an LCD device, or is made to have a more enhanced bending characteristic than the general glass substrate. As a result, problems such as downward deformation of the glass substrate, occurring while the glass substrate is moved or while unit processes are performed, can be prevented.

Before a thin glass substrate having a thickness of 0.1 t~0.4 t is introduced into a manufacturing line for an array process and a color filter process, a supplementary substrate having a thickness of about 0.3 t~0.7 t is attached onto the thin glass substrate (S101). However, the present invention is not limited to such thicknesses of the thin glass substrate and the supplementary substrate.

The thin glass substrate and the supplementary substrate can be attached to each other by contact in a vacuum state without an adhesive. An adhesive force between the two substrates may be a vacuum force, van der Waals force, an electrostatic force, a molecular bonding force, etc.

In the attached state between the thin glass substrate and the supplementary substrate, a TFT-LCD process is completed. Then, the supplementary substrate is separated from the thin glass substrate, thereby fabricating a lightweight and thin LC panel.

For the aforementioned TFT-LCD process, a large adhesive force is required. However, if the adhesive force is too large, the substrates may be damaged when the supplementary substrate is separated from the thin glass substrate. Therefore, the present invention is to provide a method for controlling an adhesive force, i.e., a method for weakening an adhesive force to a level by which the supplementary substrate can be separated from the thin glass substrate without any damages.

Figure 2A:
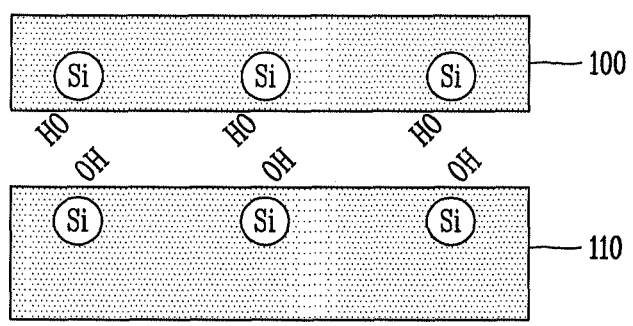
FIGS. 2A and 2B are exemplary views for explaining a method for controlling an adhesive force when a thin mother substrate and a supplementary substrate are attached to each other.
Figure 2B:
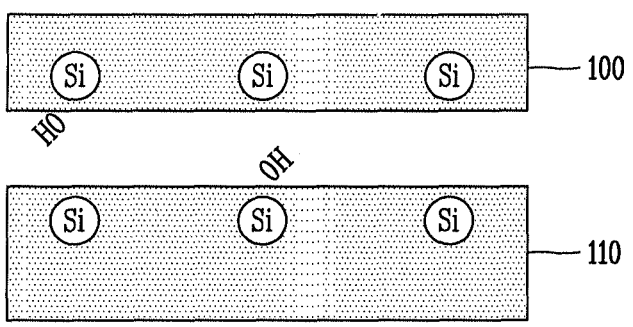

FIGS. 2A and 2B are exemplary views for explaining a method for controlling an adhesive force when a thin mother substrate and a supplementary substrate are attached to each other.

FIG. 2A is an exemplary view for explaining a principle that a thin glass substrate and a supplementary substrate are attached to each other in a vacuum state. FIG. 2B is an exemplary view for explaining a method for weakening an adhesive force when a thin glass substrate and a supplementary substrate are in an attached state.

Referring to FIG. 2A, in an initial attached state, there are a lot of OH groups at an interface between a thin glass substrate 100 and a supplementary substrate 110. Then, as the OH groups participate in a covalent bond by heat during a TFT-LCD process, a contact angle is decreased while an adhesive force is increased. If the supplementary substrate 110 is detached from the thin glass substrate 100 under such state of the increased adhesive force, the edge or a central portion of the thin glass substrate 100 may be cut-out, and part of the substrate having a large adhesive force may be damaged.

For your reference, in a case where an adhesive force between the thin glass substrate 100 and the supplementary substrate 110 is large, the substrates are severely damaged when the supplementary substrate 110 is detached from the thin glass substrate 100. Further, as the number of the OH groups increases at an interface between the thin glass substrate 100 and the supplementary substrate 110, a contact angle is decreased while an adhesive force is increased.

Referring to FIG. 2B, in a case where the OH groups are partially removed from the interface between the thin glass substrate 100 and the supplementary substrate 110 by a drying process, a gas spraying process, etc., the adhesive force between the two substrates is decreased as a molecular bonding force is decreased. In this case, a change of the contact angle due to the remaining OH groups was not observed. For instance, if a hot-air drying process is performed at a temperature of 60□~70□ for 30 seconds, a pressure measured when the supplementary substrate 110 is separated from the thin glass substrate 100 using an adhesive force (pull gauge) is decreased 0.65 kgf from 0.7 kgf. This means that the supplementary substrate 110 has been separated from the thin glass substrate 100 without any damages.

In the present invention, a drying process or a gas spraying process (e.g., spraying inactive gas onto the surface of the substrate is performed before the thin glass substrate and the supplementary substrate are attached to each other. As a result, the OH groups are partially removed. Accordingly, the supplementary substrate can be easily separated from the thin glass substrate. Detailed descriptions thereof will be explained later.

After the surface-processed thin glass substrate and supplementary substrate are attached to each other, the aforementioned thin glass substrate for an array substrate onto which the supplementary substrate has been attached (hereinafter, will be referred to as 'array substrate') undergoes an array process. Through the array process, a plurality of gate lines and data lines which define pixel regions are formed on the array substrate, and thin film transistors are formed at the pixel regions (S102). The TFTs are driving devices connected to the gate lines and the data lines. Further, a pixel electrode, connected to the TFT and driving an LC layer as a signal is applied to the TFT, is formed on the array substrate.

The aforementioned thin glass substrate for a color filter substrate onto which the supplementary substrate has been attached (hereinafter, will be referred to as 'color filter substrate') undergoes a color filter process. Through the color filter process, a color filter layer and a common electrode are formed (S103). The color filter layer is composed of red, green and blue (RGB) sub color filters. In case of fabricating an IPS (In Plane Switching) type of LCD device, the common electrode is formed on the array substrate where the pixel electrode has been formed through the array process.

Then, an alignment layer is printed onto each of the color filter substrate and the array substrate. Then, the alignment layer is rubbed so that a pretilt angle or an aligning direction can be provided to LC molecules of an LC layer to be formed between the color filter substrate and the array substrate (S104, S105).

A sealant is applied onto the rubbed color filter substrate to thus form a prescribed seal pattern (S106), and liquid crystals are dropped onto the array substrate to thus form the LC layer (S107).

Each of the color filter substrate and the array substrate is formed on a mother substrate of a large area. That is, a plurality of panel regions are formed on a mother substrate of a large area, and a thin film transistor (driving device) or a color filter layer is formed at each panel region.

The dropping method is a method for forming an LC layer by dropping and dispensing liquid crystals. More specifically, liquid crystals are dropped onto an image display region of a first mother substrate of a large area where a plurality of array substrates have been arranged, or a second mother substrate of a large area where a plurality of color filter substrates have been arranged. Then, the liquid crystals are dispensed. Then, the liquid crystals are uniformly distributed onto the entire image display region using a pressure applied to attach the first mother substrate and the second mother substrate to each other.

In a case where an LC layer is formed on an LC panel by a dropping method, a seal pattern should be implemented as a closed pattern to enclose the image display region so that leakage of liquid crystals to outside of the image display region can be prevented.

The dropping method is advantageous in that liquid crystals can be dropped within a shorter time than in a vacuum injection method, and the LC layer can be formed very quickly even in a case where the LC panel is large. Further, as only a required amount of liquid crystals are dropped onto the first mother substrate, cost increase of the LC panel due to discard of expensive liquid crystals can be prevented. This can enhance price competitiveness of the product.

Then, in an aligned state of the first mother substrate and the second mother substrate onto which liquid crystals have been dropped and a sealant has been applied, a pressure is applied to the two substrates. As a result, the first mother substrate and the second mother substrate are attached to each other by the sealant, and the liquid crystals dropped by the pressure are uniformly dispersed onto an entire region of the LC panel (S108). Under such processes, a plurality of LC panels, where the LC layer has been arranged, are formed on the large first and second mother substrates. Then, the large first and second mother substrates, where the plurality of LC panels have been formed, are separated from the supplementary substrate (S109). Then, the large first and second mother substrates are processed and cut to be separated into a plurality of LC panels. Then, each LC panel is inspected to fabricate an LCD device (S110).

As aforementioned, a drying process or a gas spraying process (e.g., spraying inactive gas onto the surface of the substrate) is performed before the thin glass substrate and the supplementary substrate are attached to each other. As a result, OH groups are partially removed. Accordingly, the supplementary substrate can be easily separated from the thin glass substrate. Detailed descriptions thereof will be explained in more detail with reference to the attached drawings.

FIGS. 3A to 3D are exemplary views schematically illustrating part of processes for fabricating a lightweight and thin LCD device according to the present invention. FIGS. 3A to 3D illustrate processes to attach the surface-processed thin glass substrate and the supplementary substrate to each other, and to separate the two substrates from each other.

Referring to FIGS. 3A to 3D, inactive gas is spayed onto entire surfaces of the thin glass substrate and the supplementary substrate, so that an adhesive force between the two substrates can be reduced and thus the supplementary substrate can be easily separated from the thin glass substrate.

Figure 3A:
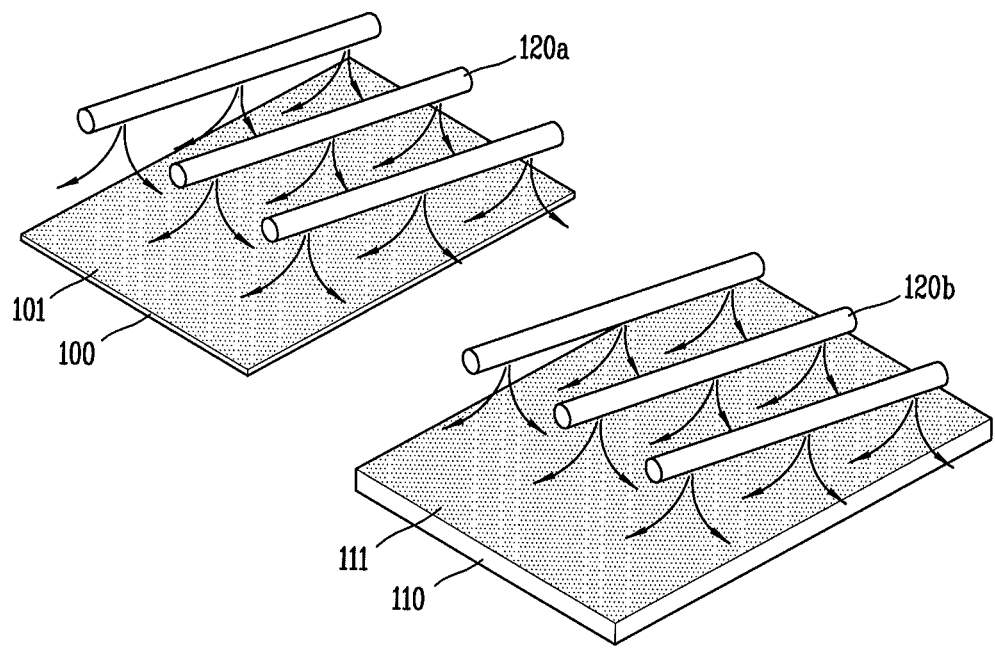
FIGS. 3A to 3D are exemplary views schematically illustrating part of processes for fabricating a lightweight and thin LCD device according to the present invention.

As shown in FIG. 3A, prepared are a thin glass substrate 100 having a thickness of about 0.1 t~0.4 t and a supplementary substrate 110 having a thickness of about 0.3 t~0.7 t.

The thin glass substrate 100 may be a large mother substrate where a plurality of color filter substrates for a color filter process have been arranged, or a large mother substrate where a plurality of array substrates for an array process have been arranged.

Next, inactive gas is sprayed onto an entire surface 101 of the thin glass substrate 100 and an entire surface 111 of the supplementary substrate 110, for facilitation of separation of the supplementary substrate 110. However, the present invention is not limited to this. That is, inactive gas may be sprayed onto a partial surface of the thin glass substrate 100 and a partial surface of the supplementary substrate 110. Alternatively, inactive gas may be sprayed onto the entire surface 101 or 111, or the partial surface of one of the thin glass substrate 100 and the supplementary substrate 110.

More specifically, in a case where an adhesive force between the thin glass substrate 100 and the supplementary substrate 110 is large, the thin glass substrate 100 may be bent or torn away when the supplementary substrate 110 is separated from the thin glass substrate 100. In this case, the adhesive force between the thin glass substrate 100 and the supplementary substrate 110 may be lowered through reformation of the surface of the substrates. That is, if a drying process is performed or gas is sprayed onto the entire surface 101 of the thin glass substrate 100 or the entire surface 111 of the supplementary substrate 110 to thus partially remove OH groups, the adhesive force is lowered. As a result, the supplementary substrate 110 can be easily separated from the thin glass substrate 100.

The gas to be sprayed may include inactive gas including helium (He), neon (Ne), argon (Ar) and nitrogen ($N_2$), oxygen ($O_2$), clean dry air (CDA) and air. Such gases are applicable to simple switching (closing and opening) equipment, because they are not harmful to the human body.

Such inactive gases may be sprayed onto the surface 101 of the thin glass substrate 100 through a nozzle 120a, and may be sprayed onto the surface 111 of the supplementary substrate 110 through a nozzle 120b. In this case, the nozzle 120a and the nozzle 120b may be provided in plurality above the thin glass substrate 100 and the supplementary substrate 110, respectively.

The inactive gas may be heated to a temperature within the range of room temperature ~55° C., preferably, about 40° C. Then, the inactive gas may be supplied to the nozzles 120a and 120b through a tube (not shown), thereby being sprayed onto the surface 101 of the thin glass substrate 100 and the surface 111 of the supplementary substrate 110.

In case of spraying inactive gas to the surface 101 of the thin glass substrate 100 and the surface 111 of the supplementary substrate 110, OH groups are partially removed from an interface between the thin glass substrate 100 and the supplementary substrate 110. As a result, a molecular bonding force is reduced and thus an adhesive force between the two substrates is reduced.

Figure 3B:
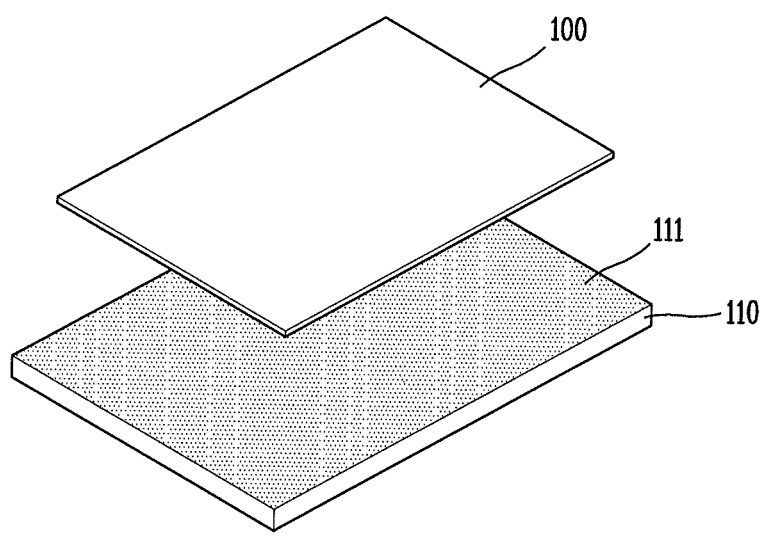
Figure 3C:
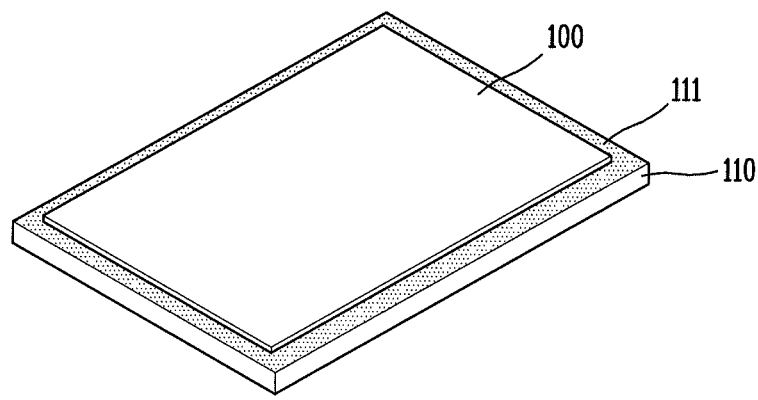

As shown in FIGS. 3B and 3C, one of the thin glass substrate 100 and the supplementary substrate 110 onto which the inactive gas has been sprayed, e.g., the thin glass substrate 100 is inversed up and down. Then, the supplementary substrate 110 is attached onto the thin glass substrate 100. If the supplementary substrate 110 is formed of a glass material, the thin glass substrate 100 and the supplementary substrate 110 can be attached to each other by contact in a vacuum state without an adhesive. An adhesive force between the two substrates 100 and 110 may be a vacuum force, van der Waals force, an electrostatic force, a molecular bonding force, etc.

A processing panel, formed as the thin glass substrate 100 having a thickness of 0.1 t~0.4 t and the supplementary substrate 110 having a thickness of 0.3 t~0.7 t are attached to each other, has the same expansion rate according to a temperature change, because the thin glass substrate 100 and the supplementary substrate 110 are formed of the same glass material. As a result, there occurs no problem such as bending of the substrates due to different expansion rates during unit processes.

As the thin glass substrate 100 having a thickness of 0.1 t~0.4 t is attached to the supplementary substrate 10 to form a processing panel, occurrence of bending of the substrates is significantly reduced. In this case, the bent degree is reduced to be equal to or lower than that of a general glass substrate having 0.7 t. As a result, there occurs no problem when performing unit processes for fabricating an LCD device.

Hereinafter, a process for attaching the thin glass substrate and the supplementary substrate to each other will be explained in more detail with reference to other drawings.

Figure 4:
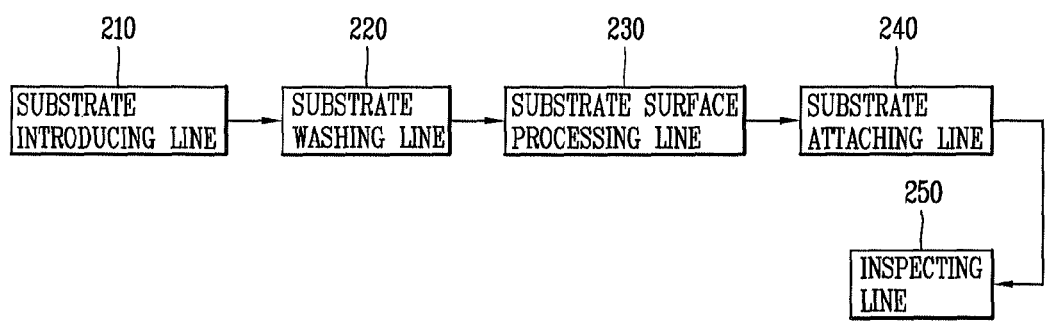
FIG. 4 is a view schematically illustrating a configuration of an attaching line according to the present invention.
Figure 5:
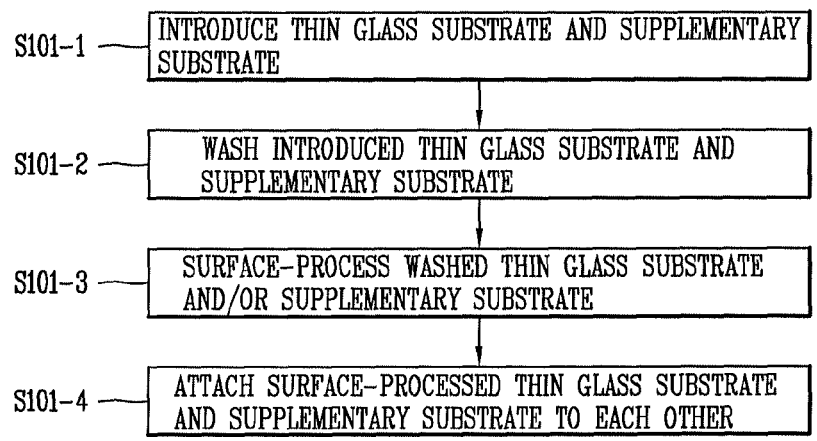
FIG. 5 is a flowchart illustrating attaching processes between a thin glass substrate and a supplementary substrate according to the present invention.

FIG. 4 is a view schematically illustrating a configuration of an attaching line according to the present invention, and FIG. 5 is a flowchart illustrating attaching processes between a thin glass substrate and a supplementary substrate according to the present invention.

Referring to FIG. 4, the attaching line according to the present invention is composed of a substrate introducing line 210, a substrate washing line 220, a substrate surface processing line 230, a substrate attaching line 240 and an inspecting line 250. Such processing lines are connected to each other by a transferring means such as a conveyor belt to undergo in-line processes.

For instance, a thin glass substrate having a thickness of about 0.1 t~0.4 t and a supplementary substrate having a thickness of 0.3 t~0.7 t are prepared, and then are introduced into the substrate introducing line 210 (S101-1).

As aforementioned, the thin glass substrate may be a large mother substrate where a plurality of color filter substrates for a color filter process have been arranged, or a large mother substrate where a plurality of array substrates for an array process have been arranged.

Next, the thin glass substrate and the supplementary substrate having been introduced into the substrate introducing line 210 are transferred to the substrate washing line 220, thereby undergoing a prescribed washing process (S101-2).

The washed thin glass substrate and supplementary substrate are transferred to the substrate surface processing line 230, thereby undergoing a surface-process (S101-3).

That is, after a TFT-LCD process, inactive gas is spayed onto the entire surface of the thin glass substrate and the supplementary substrate so that the supplementary substrate can be easily detached from the thin glass substrate. However, the present invention is not limited to this. That is, inactive gas may be sprayed onto a partial surface of the thin glass substrate and a partial surface of the supplementary substrate. Alternatively, inactive gas may be sprayed onto an entire surface or a partial surface of one of the thin glass substrate and the supplementary substrate.

The gas to be sprayed may include inactive gas including helium (He), neon (Ne), argon (Ar) and nitrogen ($N_2$), oxygen ($O_2$), clean dry air (CDA) and air. Such gases are applicable to simple switching (closing and opening) equipment, because they are not harmful to the human body.

Figure 6A:
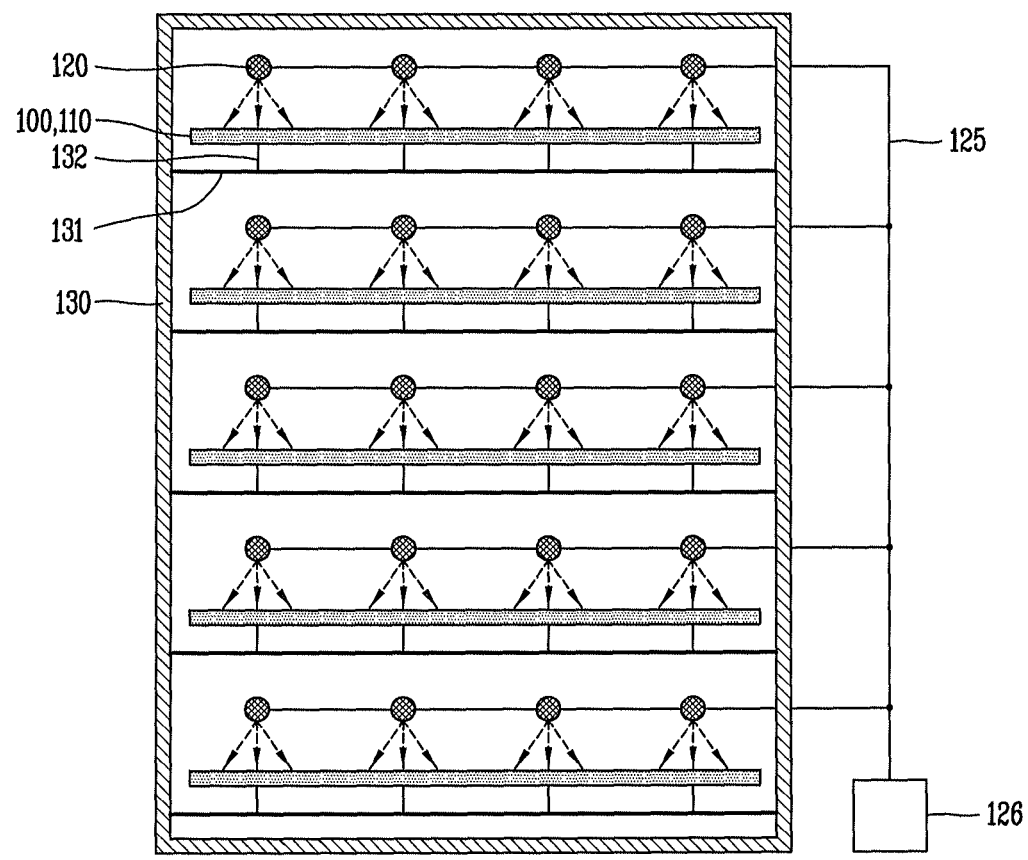
FIGS. 6A and 6B are sectional views schematically illustrating a structure of a multi-stage buffer according to the present invention.
Figure 6B:
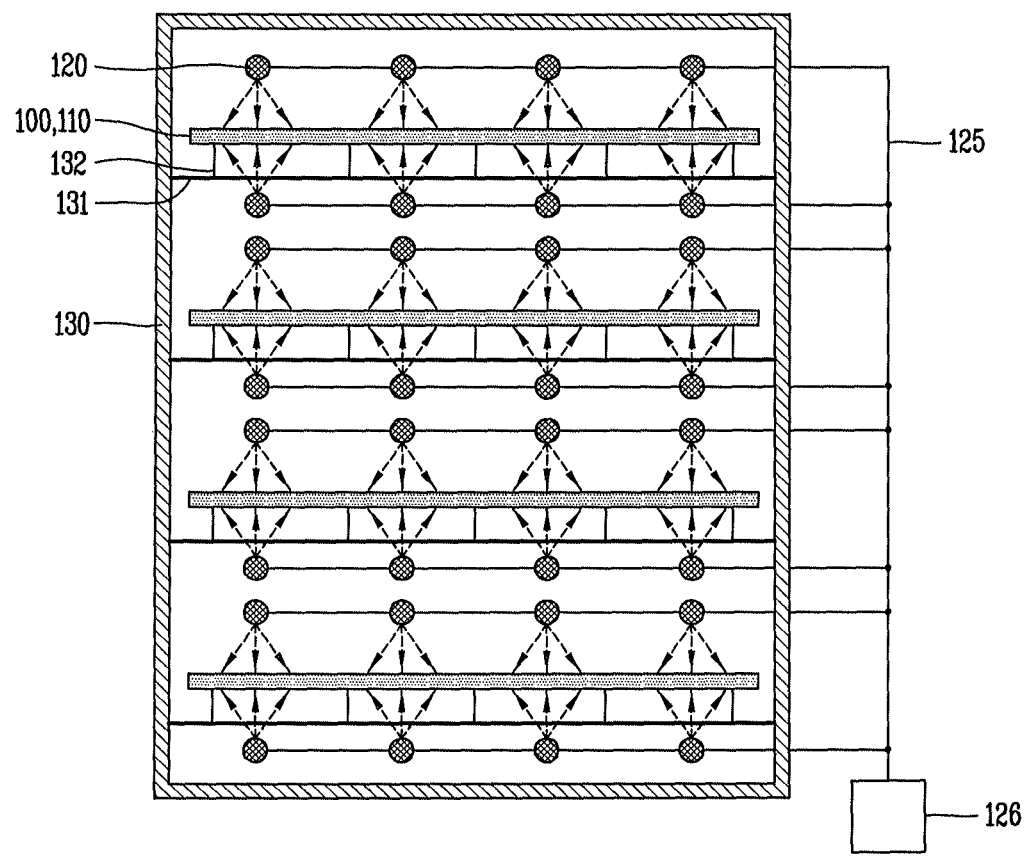

FIGS. 6A and 6B are sectional views schematically illustrating a structure of a multi-stage buffer according to the present invention.

FIG. 6A illustrates that gas is sprayed from an upper side of substrates accommodate in a multi-stage buffer, and FIG. 6B illustrates that gas is sprayed from an upper side and a lower side of the substrates accommodate in a multi-stage buffer.

Referring to FIGS. 6A and 6B, a multi-stage buffer 130 according to the present invention is formed to have multi stages for accommodating a plurality of substrates 100 and 110, i.e., the thin glass substrates 100 and the supplementary substrate 110. The substrates 100 and 110 accommodated in the multi stages are loaded onto pins 132 or rollers of a plate 131.

The plate 131 may be formed in a plate shape, or a frame shape having an opening therein. In a case where the plate is formed in a frame shape, gas sprayed from a lower side may be sprayed onto a lower surface of the substrates 100 and 110 loaded onto the plate 131.

In case of spraying gas from an upper side and a lower side of the substrates 100 and 110 loaded on the plate 131, upper and lower nozzles 120 may be disposed on the same position with the same interval from the loaded substrates 100 and 110.

The aforementioned inactive gas is sprayed onto an upper surface or both an upper surface and a lower surface of the substrates 100 and 110 loaded onto the plate 131, through the plurality of nozzles 120. The nozzles 120 may be provided above or above and below the loaded substrates 100 and 110.

The inactive gas may be heated to a temperature within the range of room temperature ~55° C., preferably, about 40° C. The inactive gas stored in a tank 126 may be supplied to the nozzles 120 through a tube 125, thereby being sprayed onto the surface of the substrates 100 and 111.

In case of spraying inactive gas to the surface of the thin glass substrate and the supplementary substrate, OH groups are partially removed from an interface between the thin glass substrate and the supplementary substrate. As a result, a molecular bonding force is reduced and thus an adhesive force between the two substrates is reduced.

For reference, in case of spraying clean dry air (CDA) to the substrates for 2 minutes, damages of the substrates occurred when the supplementary substrate is separated from the thin glass substrate. However, in case of spraying CDA for 5 minutes, 7 minutes or 10 minutes, the supplementary substrate was easily separated from the thin glass substrate without any damages of the substrates. In case of spraying CDA for 5 minutes and 7 minutes, an adhesive force between the thin glass substrate and the supplementary substrate was 0.61 kgf and 0.53 kgf.

The spraying time of inactive gas may depend on a processing temperature of an array process or a color filter process. It may take a longer spraying time as a processing temperature is higher. For instance, the inactive gas, etc. may be sprayed for 2.5 minutes~20 minutes.

O groups as well as the aforementioned OH groups may cause the adhesive force between the two substrates to be increased. Accordingly, it is proper to maintain the humidity of the attaching line to a value of 40% or less than.

One of the surface-processed thin glass substrate and the supplementary substrate (e.g., the thin glass substrate onto which the inactive gas has been sprayed) is inversed up and down. Then, the supplementary substrate is attached onto the thin glass substrate (S101-4). However, the present invention is not limited to this. In case of spraying inactive gas onto an upper surface and a lower surface of the substrates, the thin glass substrate and the supplementary substrate may be attached to each other without the inverting process.

The thin glass substrate and the supplementary substrate are attached to each other in the substrate attaching line 240. In case of using a glass substrate as the supplementary substrate, the two substrates can be attached to each other by contact in a vacuum state without an adhesive. An adhesive force between the two substrates may be a vacuum force, van der Waals force, an electrostatic force, a molecular bonding force, etc.

Then, the thin glass substrate and the supplementary substrate attached to each other undergo an inspection process in the inspecting line 250, for inspection whether an inferiority related to the attachment has occurred.

Then, the thin glass substrate 100, to which the supplementary substrate 110 has been attached, undergoes a color filter process or an array process, thereby forming a thin film transistor (driving device) or a color filter layer on each panel region.

Figure 3D:
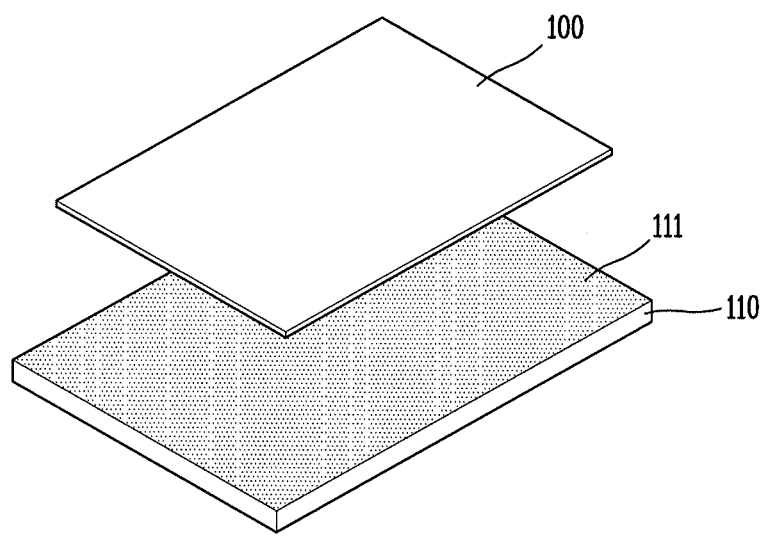

Then, as shown in FIG. 3D, the supplementary substrate 110 should be separated from the thin glass substrate 100 after prescribed processes are completed. As aforementioned, in a case where OH groups have been partially removed from an interface between the thin glass substrate 100 and the supplementary substrate 110 by a drying process, a gas spraying process, etc., a molecular bonding force is reduced and thus the supplementary substrate 110 is easily detached from the thin glass substrate 100.

The supplementary substrate 110 detached from the thin glass substrate 100 may be attached to a new glass substrate, thereby being recycled for a new process.

According to such detachable mounting method, the thin glass substrate or the supplementary substrate may be lifted-up in a state where an upper part thereof is held by a vacuum pad. In this case, OH groups are partially removed from an interface between the thin glass substrate and the supplementary substrate. As a result, an adhesive force between the two substrates is small and thus the supplementary substrate is easily separated from the thin glass substrate.

Hereinafter, processes for separating the supplementary substrate from a completed LC panel which is in an attached cell state will be explained in more detail with reference to the attached drawings.

Figure 7:
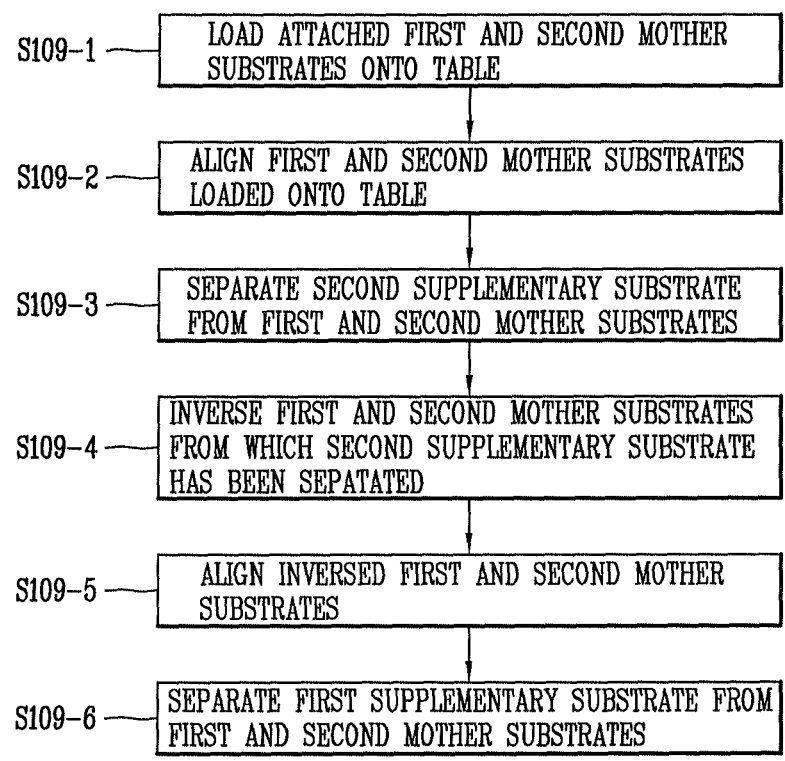
FIG. 7 is a flowchart illustrating a separation process of a supplementary substrate according to the present invention.

FIG. 7 is a flowchart illustrating a separation process of a supplementary substrate according to the present invention.

First of all, first and second supplementary substrates should be separated from first and second mother substrates attached to each other after prescribed processes are completed. To this end, the first and second mother substrates attached to each other are loaded onto a table of detaching equipment (S109-1).

The first and second mother substrates may be attached to each other in a state where a second mother substrate having color filter substrates is laminated on a first mother substrate having thin film transistor array substrates. However, the present invention is not limited to this. That is, the first and second mother substrates may be attached to each other in a state where a first mother substrate having thin film transistor array substrates is laminated on a second mother substrate having color filter substrates.

Each of the first mother substrate having thin film transistor array substrates, and the second mother substrate having color filter substrates may be formed of a thin glass mother having a thickness of about 0.1 t~0.4 t. In this case, a first supplementary substrate having a thickness of about 0.3 t~0.7 t may be attached to the first mother substrate, and a second supplementary substrate having a thickness of about 0.3 t~0.7 t may be attached to the second mother substrate. However, the present invention is not limited to such thicknesses of the thin first and second mother substrates and the first and second supplementary substrates.

The thin first and second mother substrates and the first and second supplementary substrates can be attached to each other, by contact in a vacuum state. An adhesive force between the two substrates 100 and 110 may be a vacuum force, van der Waals force, an electrostatic force, a molecular bonding force, etc.

The first and second mother substrates are loaded onto a table so that the second supplementary substrate to be separated from the second mother substrate is toward the upper side. A plurality of vacuum pads are installed above the loaded first and second mother substrates.

The first and second mother substrates loaded onto the table of the detaching equipment are aligned with the vacuum pads by an align unit (S109-2).

Then, the second supplementary substrate is completely detached from the second mother substrates using the vacuum pads (S109-3).

Then, the first and second mother substrates from which the second supplementary substrate has been separated are inversed up and down, and then are loaded onto the table of the detaching equipment (S109-4).

More specifically, the first and second mother substrates are loaded onto the table so that the first supplementary substrate to be separated from the first mother substrate is toward the upper side. The aforementioned vacuum pads are installed above the loaded first and second mother substrates.

The first and second mother substrates loaded onto the table of the detaching equipment are aligned with the vacuum pads by the align unit (S109-5).

Then, the first supplementary substrate is completely detached from the first mother substrate using the vacuum pads (S109-6).

As aforementioned, in the present invention, inactive gas may be applied onto an entire surface of a partial surface of one of the thin glass substrate and the supplementary substrate before the thin glass substrate and the supplementary substrate are attached to each other. This will be explained in more detail with reference to the attached drawings.

FIGS. 8A to 8D are exemplary views schematically illustrating part of processes for fabricating a lightweight and thin LCD device according to the present invention.

FIGS. 8A to 8D illustrates that inactive gas is applied onto an entire surface of a supplementary substrate, so that the supplementary substrate can be easily detached from a thin glass substrate as an adhesive force between the two substrates is reduced.

Figure 8A:
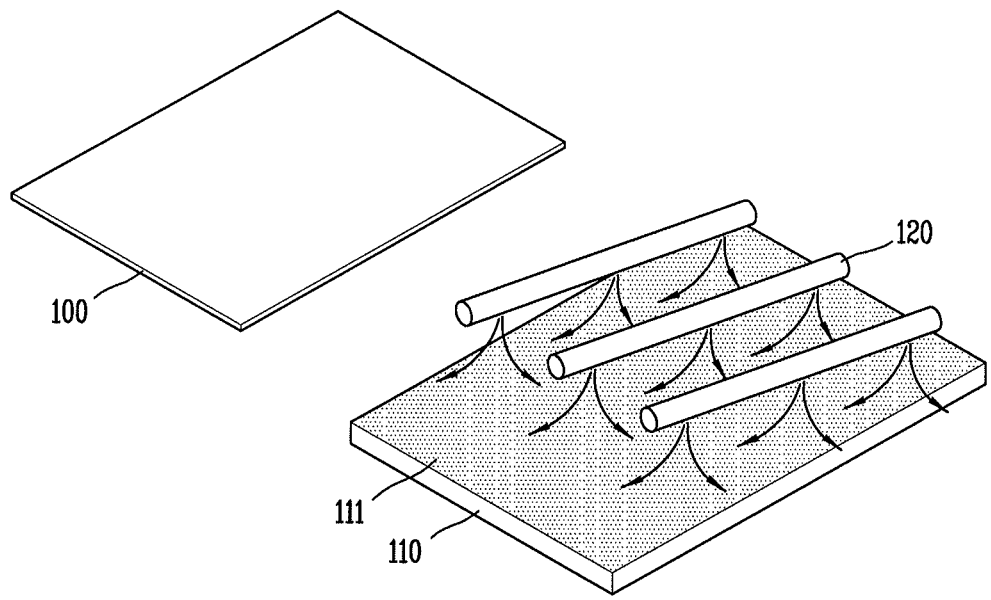
FIGS. 8A to 8D are exemplary views schematically illustrating part of processes for fabricating a lightweight and thin LCD device according to the present invention.

As shown in FIG. 8A, prepared are a thin glass substrate 100 having a thickness of about 0.1 t~0.4 t and a supplementary substrate 110 having a thickness of about 0.3 t~0.7 t.

The thin glass substrate 100 may be a large mother substrate where a plurality of color filter substrates for a color filter process have been arranged, or a large mother substrate where a plurality of array substrates for an array process have been arranged.

Next, inactive gas is sprayed only onto an entire surface 111 of the supplementary substrate 110 for facilitation of separation of the supplementary substrate 110. However, the present invention is not limited to this. That is, inactive gas may be sprayed onto a partial surface of the supplementary substrate 110. Alternatively, inactive gas may be sprayed onto an entire surface or a partial surface of the thin glass substrate 100.

As aforementioned, the gas to be sprayed may include inactive gas including helium (He), neon (Ne), argon (Ar) and nitrogen ($N_2$), oxygen ($O_2$), clean dry air (CDA), air, etc. Such gases are applicable to simple switching (closing and opening) equipment such as a multi-stage buffer, because they are not harmful to the human body.

Such inactive gases are sprayed onto the surface 111 of the supplementary substrate 110 through a nozzle 120. In this case, the nozzle 120 may be provided in plurality above the supplementary substrate 110.

The inactive gas may be heated to a temperature within the range of room temperature ~55° C., preferably, about 40° C. Then, the inactive gas may be supplied to the nozzles 120 through a tube (not shown), thereby being sprayed onto the surface 111 of the supplementary substrate 110.

In case of spraying inactive gas onto the surface 111 of the supplementary substrate 110, OH groups are partially removed from an interface between the thin glass substrate 100 and the supplementary substrate 110. As a result, a molecular bonding force is reduced and thus an adhesive force between the two substrates is reduced. In this case, a spraying time should be longer than in a case where inactive gas is sprayed onto two surfaces of the thin glass substrate 100 and the supplementary substrate 110. For instance, the spraying time may be within the range of 10 minutes~20 minutes.

Figure 8B:
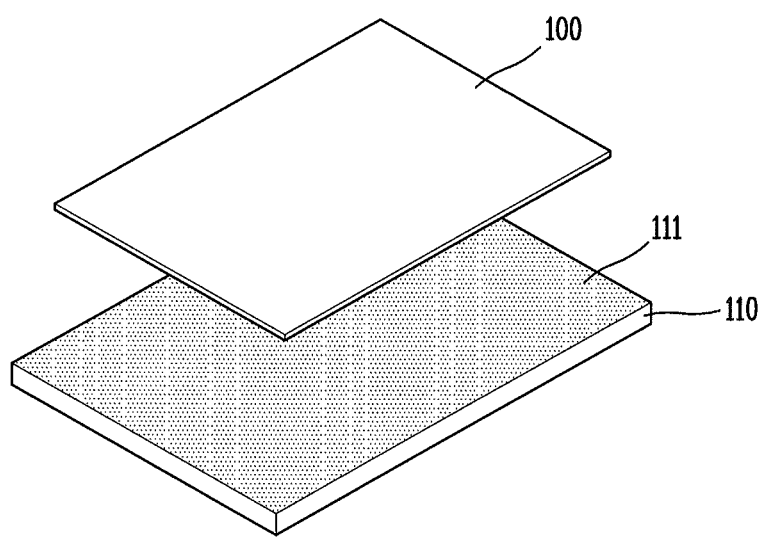
Figure 8C:
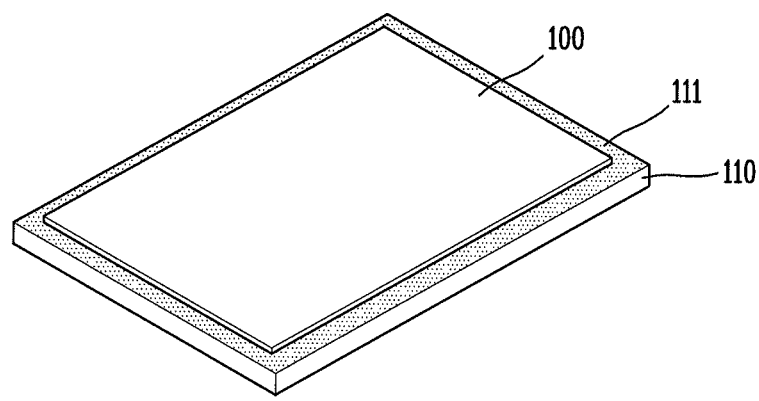

Then, as shown in FIGS. 8B and 8C, the supplementary substrate 110 onto which the inactive gas has been sprayed is attached to the thin glass substrate 100. If the supplementary substrate 110 is formed of a glass material, the thin glass substrate 100 and the supplementary substrate 110 can be attached to each other by contact in a vacuum state without an adhesive. An adhesive force between the two substrates 100 and 110 may be a vacuum force, van der Waals force, an electrostatic force, a molecular bonding force, etc.

Then, the thin glass substrate 100 onto which the supplementary substrate 110 has been attached undergoes the aforementioned color filter process or array process, so that a thin film transistor (driving device) or a color filter layer is formed at each panel region.

Figure 8D:
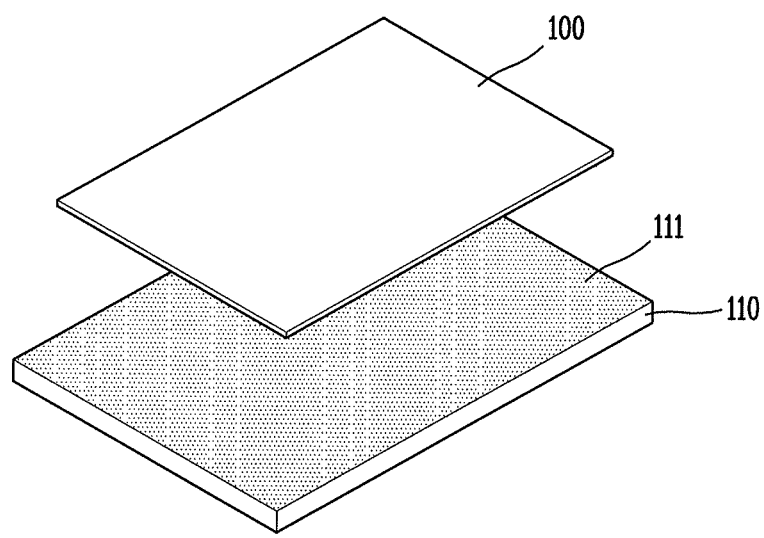

Then, as shown in FIG. 8D, the supplementary substrate 110 should be separated from the thin glass substrate 100 after prescribed processes are completed. As aforementioned, in a case where OH groups have been partially removed from an interface between the thin glass substrate 100 and the supplementary substrate 110 by a drying process, a gas spraying process, etc., a molecular bonding force is reduced and thus the supplementary substrate 110 is easily detached from the thin glass substrate 100.

The supplementary substrate 110 detached from the thin glass substrate 100 may be attached to a new glass substrate, thereby being recycled for a new process.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method for fabricating a lightweight and thin liquid crystal display device, the method comprising:
   providing a first supplementary substrate, a second supplementary substrate, a thin first mother substrates, and a thin second mother substrate in a multi-stage buffer;
   spraying gas onto at least one entire surface of the first supplementary substrate and the thin first mother substrate through a plurality of nozzles provided above the first supplementary substrate or the first mother substrate, and thereby partially removing OH groups from the surface;
   spraying gas onto at least one entire surface of the second supplementary substrate and the thin second mother substrate through a plurality of nozzles provided above the second supplementary substrate or the second mother substrate, and thereby partially removing OH groups from the surface;
   attaching the first supplementary substrate and the second supplementary substrate onto the thin first mother substrate and the thin second mother substrate, respectively;
   performing an array process on the first mother substrate onto which the first supplementary substrate has been attached;
   performing a color filter process on the second mother substrate onto which the second supplementary substrate has been attached;
   attaching the first mother substrate having undergone the array process, to the second mother substrate having undergone the color filter process; and
   separating the first and second supplementary substrates from the first and second mother substrates attached to each other.

2. The method of claim 1, wherein the gas to be sprayed includes inactive gas including a gas selected from the group consisting of helium (He), neon (Ne), argon (Ar) and nitrogen ($N_2$), oxygen ($O_2$), clean dry air (CDA) and air.

3. The method of claim 1, wherein the gas is sprayed through the plurality of nozzles provided above and below the thin mother substrate or the supplementary substrate.

4. The method of claim 1, wherein the gas is sprayed after being heated to a temperature within the range of room temperature ~55° C.

5. The method of claim 4, wherein the gas is sprayed for 2.5 minutes ~20 minutes,
   wherein the spraying time depends on a processing temperature of the array process and the color filter process, and
   wherein a spraying time becomes longer as the processing temperature becomes higher.

6. The method of claim 1, wherein one of the thin mother substrate and the supplementary substrate onto which the gas has been sprayed is inversed up and down, and then the supplementary substrate is attached onto the thin mother substrate.

7. The method of claim 1, wherein the first and second supplementary substrates are separated from the first and second mother substrates attached to each other by lifting up in a state where an upper part of the first supplementary substrate or the second supplementary substrate is held by a plurality of vacuum pads.

* * * * *